United States Patent [19]
Benner

[11] Patent Number: 5,525,995
[45] Date of Patent: Jun. 11, 1996

[54] DOPPLER DETECTION SYSTEM FOR DETERMINING INITIAL POSITION OF A MANEUVERING TARGET

[75] Inventor: Robert H. Benner, Gaithersburg, Md.

[73] Assignee: Loral Federal Systems Company, McLean, Va.

[21] Appl. No.: 480,704

[22] Filed: Jun. 7, 1995

[51] Int. Cl.$^6$ .................................................. G01S 13/00
[52] U.S. Cl. ........................... 342/90; 342/107; 342/114; 342/146; 342/195; 342/95
[58] Field of Search ............................ 342/90, 107, 114, 342/146, 195, 95

[56] References Cited

U.S. PATENT DOCUMENTS

| | | | |
|---|---|---|---|
| 5,214,433 | 5/1993 | Alouani et al. | 342/95 |
| 5,313,212 | 5/1994 | Ruzicka | 342/101 |
| 5,325,098 | 6/1994 | Blair et al. | 342/95 |

OTHER PUBLICATIONS

Bar–Shalom et al., "Tracking a Maneuvering Target Using Input Estimation Versus the Interacting Multiple Model Algorithm", Mar. 1989, pp. 296–302, IEEE Transactions on Aerospace and Electronics Systems, vol. AES–25, No. 2.

Broida et al., "Recursive 3–D Motion Estimation from a Monocular Image Sequence," Jul. 1990, pp. 639–655, IEEE Transactions on Aerospace and Electronic Systems, vol. 26, No. 4.

Chang et al., "Ballistic Trajectory Estimation with Angle-–Only Measurements," Jun. 1980, pp. 474–480, IEEE Transactions on Automatic Control, vol. AC–25, No. 3.

Mealy et al., "Application of Multiple Model Estimation to a Recursive Terrain Height Correlation System," Mar. 1983, pp. 323–331, IEEE Transactions on Automatic Control, vol. AC–28, No. 3.

Aidala, "Kalman Filter Behavior in Bearings–Only Tracking Applications," pp. 29–39, IEEE Transactions on Aerospace and Electronics Systems, vol. AES–15, No. 1.

Bloom et al., "Bayesian Multi–Sensor Tracking for Advanced Air–Traffic Control Systems,"Aug. 1988, National Aerospace Laboratory.

Sorenson, "Kalman Filtering Techniques," pp. 219–291.

*Primary Examiner*—J. Woodrow Eldred
*Attorney, Agent, or Firm*—Lane, Aitken & McCann

[57] ABSTRACT

In a system for detecting the position and trajectory of a target, Doppler measurements from a bistatic continuous wave radar system are used exclusively to provide information about the target. Radar signals are transmitted to the target by a plurality of transmitters and at least one receiver is provided to receive the signals from the target and make Doppler measurements. A nonlinear least squares estimator is used to estimate the initial target position and a Kalman filter is used to predict the target trajectory from the initial position assumed by the NLS estimator and from the Doppler measurements. The Kalman filter also generates a set of predicted Doppler measurements from the predicted trajectory. The nonlinear least squares estimator is used to compute a correction to the estimated initial position from partial differentials of the initial position and from the differences between the predicted and actual Doppler measurements. The difference between the actual Doppler measurements and the predicted Doppler measurements are also used to generate a test statistic as an indication of the accuracy of the predicted trajectory.

6 Claims, 3 Drawing Sheets

DOPPLER DETECTION SYSTEM FOR DETERMINING INITIAL POSITION OF A MANEUVERING TARGET

BACKGROUND OF THE INVENTION

This invention relates to a system for detecting the position and trajectory of a target and, more particularly, to a system in which the input data from the target is in the form of Doppler measurements provided by bistatic continuous-wave (CW) radar.

The first task of a target tracking system, after detecting the target and collecting Doppler measurements over a time period, is to estimate the initial values for the target time, velocity, and acceleration at a selected initialization time, e.g., at the start of the time period. Although the Doppler measurements have good velocity information on the target trajectory, track initialization is generally difficult for these systems since the Doppler measurements do not usually have good position information. Initialization is complicated further by assuming the target has maneuvering capability and that the maneuvering is not predictable.

The traditional approaches of solving the problem of trajectory initialization is to apply a nonlinear least squares (NLS) algorithm to an interval of data, or to accept a more arbitrary starting point (based in general on less data and less processing), and rely on a Kalman filter recursive algorithm to self-correct for this initialization error as new data is processed.

In order to have acceptable performance, an NLS algorithm would require a knowledge of the number of maneuvers of the target during the time period of the data. Either this number would have to be estimated from the data or the NLS could generate solutions for each of several hypothesized numbers of maneuvers and choose the hypothesis yielding the best results. In either case, the NLS could have difficulties because of the possible large number of states being estimated and the poor observability of some of these states (e.g., the start times for each maneuver).

The Kalman filter approach, which would estimate all states over the entire trajectory, would start from a generally poor initialization and rely on the filter to self-correct for this initialization error as more and more data are processed by the filter. The difficulties in this approach arise from the nonlinearity of the filter, the poor initialization, and the low quality of position information in the Doppler data. These can make filter divergence at start-up a serious problem.

SUMMARY OF THE INVENTION

The present invention employs a new approach to solving the initial target positioning involving the use of both a nonlinear least squares estimator (NLS) and a reduced order Kalman filter (ROKF) and circumvents some of the difficulties encountered by the more traditional approaches discussed above. In accordance with the invention, the system collects Doppler data over the time interval of the trajectory to be detected. The time interval of the trajectory could correspond, for example, to a short period covering the earliest observations of the target. In the system of the invention, the states representing the trajectory model are partitioned into position states at time t=0 (x, y and z coordinates of the initial position generally having low observability) and nonposition states over the trajectory time interval (velocity and acceleration generally having high observability). The NLS estimator estimates the position at time t=0, the start of the trajectory, and the ROKF provides predicted Doppler measurements over the trajectory interval based on the estimated initial position provided by the NLS. The ROKF will estimate the non-position states (velocity and acceleration) over the trajectory interval in order to provide predicted Doppler measurements to the NLS. The ROKF accepts the initial position provided by the NLS at time t=0 as a starting point and determines the target position over the trajectory by integrating its own estimates of the non-position states. The ROKF uses the determined position of the target over the trajectory to compute the predicted Doppler measurements.

In accordance with the invention, the NLS assumes an initial target position X, for example, having known x and y coordinates. The assumed position does not have to be close to the actual initial position of the target. This assumed initial position is passed to the ROKF which treats the assumed initial position as truth and computes predicted measurements over the trajectory based on assumed initial position. The predicted measurements are returned by the ROKF to the NLS which computes a test statistic from the predicted measurements and the actual measurements. The NLS computes a correction $\Delta X$ to the initial position based on a matrix of partial differentials it constructs using first-order differences. These first-order differences are obtained by perturbing each component of X and utilizing the ROKF to provide predicted Doppler measurements for each component perturbation. The test statistic is then recomputed using the initial position updated by the corrected value. If the test statistic is reduced, the updated value is then treated as the new initial position and the process is repeated until the test statistic no longer decreases. At this point, the determined initial position will have been brought close to the actual initial position of the target and the determined trajectory will be close to the actual trajectory.

DESCRIPTION OF A PREFERRED EMBODIMENT

Figure 1:
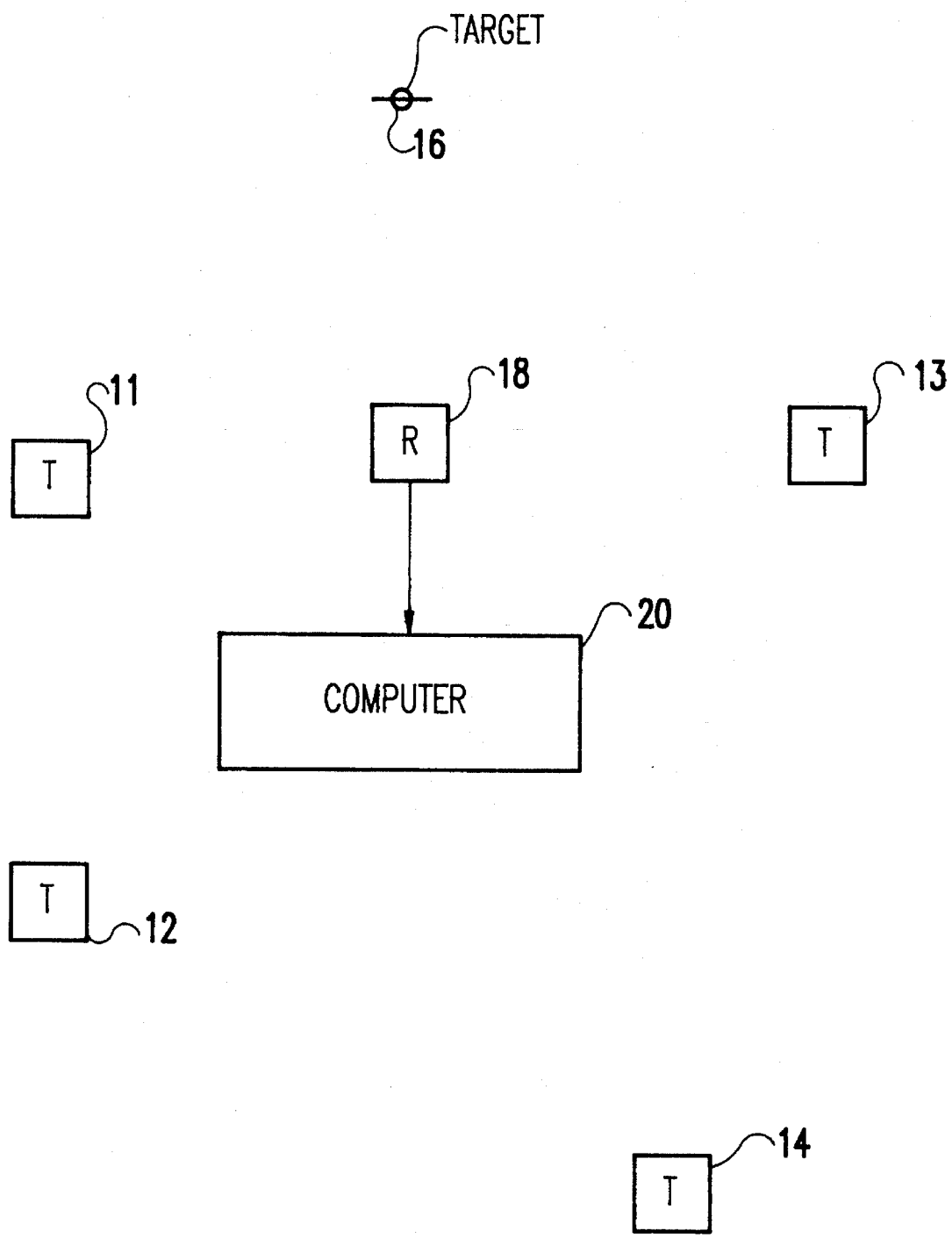
FIG. 1 is a block diagram schematically illustrating the system of the invention.

In the specific preferred embodiment of the invention shown in FIG. 1, four bistatic CW radar transmitters 11–14 of a bistatic CW radar system transmit continuous wave radar signals to a target 16, the initial position and trajectory of which is to be determined. In an ideal situation, the transmitters would encircle the target, but in most practical applications, this ideal is not obtainable and the arrangement shown in the specific embodiment, which shows 130 degrees of encirclement, provides good performance. The signals from each transmitter are reflected by the target 16 and detected by a bistatic CW radar receiver 18, which transmits the resulting Doppler measurements to a computer 20. The computer 20 is provided with a nonlinear least squares (NLS) estimator and a reduced order Kalman filter (ROKF). The NLS and the ROKF interact with each other to provide a determination of the initial position of the target and the trajectory of the target over a time interval in which the Doppler measured signals are received. To detect the initial position of the target and the trajectory of the target, the system will collect Doppler data over a time interval, 0 to T, during which the target traverses a trajectory to be determined. The task of the system is to determine the initial position of the trajectory and the trajectory itself using the Doppler data collected over the time period.

The underlying model used by the NLS estimator is given by $$Z = h(X) + \zeta$$

in which $$Z = [Z_1, Z_2, \ldots, Z_M]^T$$

is the set of all Doppler measurements over the time interval $t=0$ to T, X is the parameter vector of position states at time $t=0$, $\zeta$ is random measurement noise, and is given by $\zeta = [\zeta_1, \zeta_2, \ldots \zeta_M]^T$ and $h(X)$ represents the nonlinear relationship between the initial position X and the Doppler measurements.

For purposes of explaining the invention, an example of the trajectory will be assumed wherein the target remains at a constant known altitude, maintains constant speed, and maintains constant turn-rate over multiple maneuver segments, and Doppler signals are received at one second intervals from the target over a 50 second trajectory. With four Doppler transmitters, this example will yield 204 measurements, 51 measurements for each transmitter. The parameter vector X, which identifies the coordinates of the assumed initial position will only have two coordinate values, $x_0$ and $y_0$. Z is the vector of N=204 Doppler measurements taken over time $t=0$ to T. The Doppler measurements each represent a value called a bistatic range rate, $\dot{R}$, which is the rate of change of the sum of the distance from a transmitter 11 to 14 to the target 16 plus the distance from the target 16 to the receiver 18. The predicted measurements for a given estimate of X at an arbitrary iteration of the NLS procedure are represented by $$\hat{Z} = h(\hat{X}) = [\hat{Z}_1, \hat{Z}_2, \ldots, \hat{Z}_M]^T$$

(The symbols $\hat{Z}$ and $\hat{X}$ means that the values of Z and X are predicted or estimated.) The NLS assesses the relative accuracy of the estimate of X by computing the merit function $$\chi^2(\hat{X}) = \sum_{i=1}^{M} \left( \frac{Z_i - \hat{Z}_i}{\sigma_i} \right)^2,$$

in which $\sigma_i^2 = \text{var}[Z_i]$.

The smaller the value of the merit function, the better the predicted measurements match the actual measurements and the better, in general, the estimate of position states will match the true position states.

The NLS must be able to compute the merit function and partial derivatives of the measurements with respect to the position states in order to determine how to improve the initial position estimate at each iteration step. It cannot do this directly since it has no estimate of the trajectory except for initial position. It accomplishes this task by utilizing the ROKF to estimate the non-position states over the interval, and receiving back from the ROKF predicted Doppler measurements.

The dependence of the predicted Doppler measurements (calculated by ROKF) on the NLS's initial position must be maintained. This dependence is forced by having the ROKF treat the NLS's initial position as truth and using it as a starting point. The ROKF needs to know target position through the interval 0 to T in order to compute predicted Doppler measurements. It gets position by starting at the initial position supplied by the NLS, and integrating its own estimates of velocity as it progresses through the interval 0 to T.

In order to assess the quality of its estimates, the NLS needs predicted Doppler measurements determined from its estimated parameter vector, i.e., it needs to have computed $$\hat{Z} = h(\hat{X})$$

in which $\hat{X}$ is the estimated parameter vector consisting of $x_0$ and $y_0$.

However, the NLS cannot do this task directly since predicted bistatic range rate measurements depend on target position and velocity at the time of the measurements. As previously stated, the parameter vector consists of the position of the target at initialization time only.

This problem is overcome by using the ROKF to compute the predicted measurements. These predictions, however, must depend on the NLS's parameter vector. The roles of and interaction between the NLS and ROKF in computing the predicted measurements is a central feature of the invention.

The operation of the system is summarized as follows:

The NLS passes the initial position estimate $x_0$ and $y_0$ to the ROKF. The ROKF treats this initial position estimate as truth (i.e., a known quantity, not a parameter to be estimated).

The ROKF estimates target velocity and acceleration over 0 to T. The ROKF computes predicted Doppler measurements over 0 to T as a natural part of its algorithm. For these, it needs to know target position at each time point where measurements occur. It does not estimate target position directly, but integrates its own velocity estimates from the initial position supplied by the NLS to the time of the measurements.

The ROKF returns these predicted measurements to the NLS. Its estimated velocity and acceleration states are not used (directly) by the NLS.

It is important to note a subtlety in the second point. From the ROKF's point of view, the target's position at an arbitrary time is based on a known initial position (supplied by the NLS) and its own determination of velocity integrated to the time of the measurement. If the initial position is incorrect, the position throughout the interval will be incorrect (in general), and the velocity profile observed by the ROKF will not match the dynamic model of target motion used by the ROKF. One might say that the ROKF sees the error in initial position as a mismatch between its dynamic model and the observed velocity profile over the interval 0 to T. (If the initial position is correct, the velocity profile observed by the ROKF will match the dynamic model of motion, except for random measurement noise, since it is assumed that the trajectory is accurately modeled by this dynamic model.) Thus model mismatch will cause differences between predicted and actual measurements, aside from the differences due to random measurement noise. As the initial position estimate is improved by the NLS at each successive iteration, the velocity profile observed by the ROKF will better match the dynamic model, and the differences due to model mismatch will become smaller.

The NLS, utilizing the ROKF as described above, computes the partials matrix H numerically as follows:

$$H = \frac{dh(X)}{dX} = \frac{d\hat{Z}}{dX} = [H_1 : H_2 : \ldots H_N]^T = \begin{vmatrix} H_{11} & \ldots & H_{1N} \\ \cdot & & \cdot \\ \cdot & & \cdot \\ \cdot & & \cdot \\ \cdot & & \cdot \\ \cdot & & \cdot \\ \cdot & & \cdot \\ H_{M1} & \ldots & H_{MN} \end{vmatrix}$$

in which M is the number of Doppler measurements and N is the number of dimensions of the initial position X;

$$H_n = \frac{h(\hat{X} + \delta X_n) - h(\hat{X})}{\delta X_n} \text{ for } 1 \leq n \leq N,$$

$h(\hat{X} + \delta X^n)$ and $h(\hat{X})$ are predicted measurements from ROKF for each estimated position of the trajectory.

In the example, the parameter vector X has only two values $x_0$ and $y_0$ which means that N=2 in the above equation, ... $H=[H_1:H_2]$ and $$H_1 = \frac{h(\hat{X} + \delta x_0) - h(\hat{X})}{\delta x_0}$$

$$H_2 = \frac{h(\hat{X} + \delta y_0) - h(\hat{X})}{\delta y_0}$$

in which $\delta x_0$ is the perturbation in the x coordinate value $x_0$ of the initial position and $\delta y_0$ is the perturbation in the y coordinate value $y_0$ of the initial position. The ROKF must be executed once for each state element perturbation and once for the unperturbed state in order for the NLS to construct the partials matrix H. Since N=2 in the example, three executions of the ROKF with slightly differing initial positions are needed to compute H.

The ROKF is also utilized to provide the predicted measurements required to compute the merit function. After the differential correction is computed, the estimated parameter vector is updated only if the merit function has decreased, i.e., $$\hat{X} = \hat{X} + \Delta X$$

only if $X^2(\hat{X} + \Delta X) < X^2(\hat{X})$

Otherwise, scale factor $\alpha$ in the equation for computing $\Delta X$ is adjusted, a new differential correction is computed, and the merit function test is repeated. After three successive failures to improve the merit function, the NLS iteration is ended.

Figure 2:
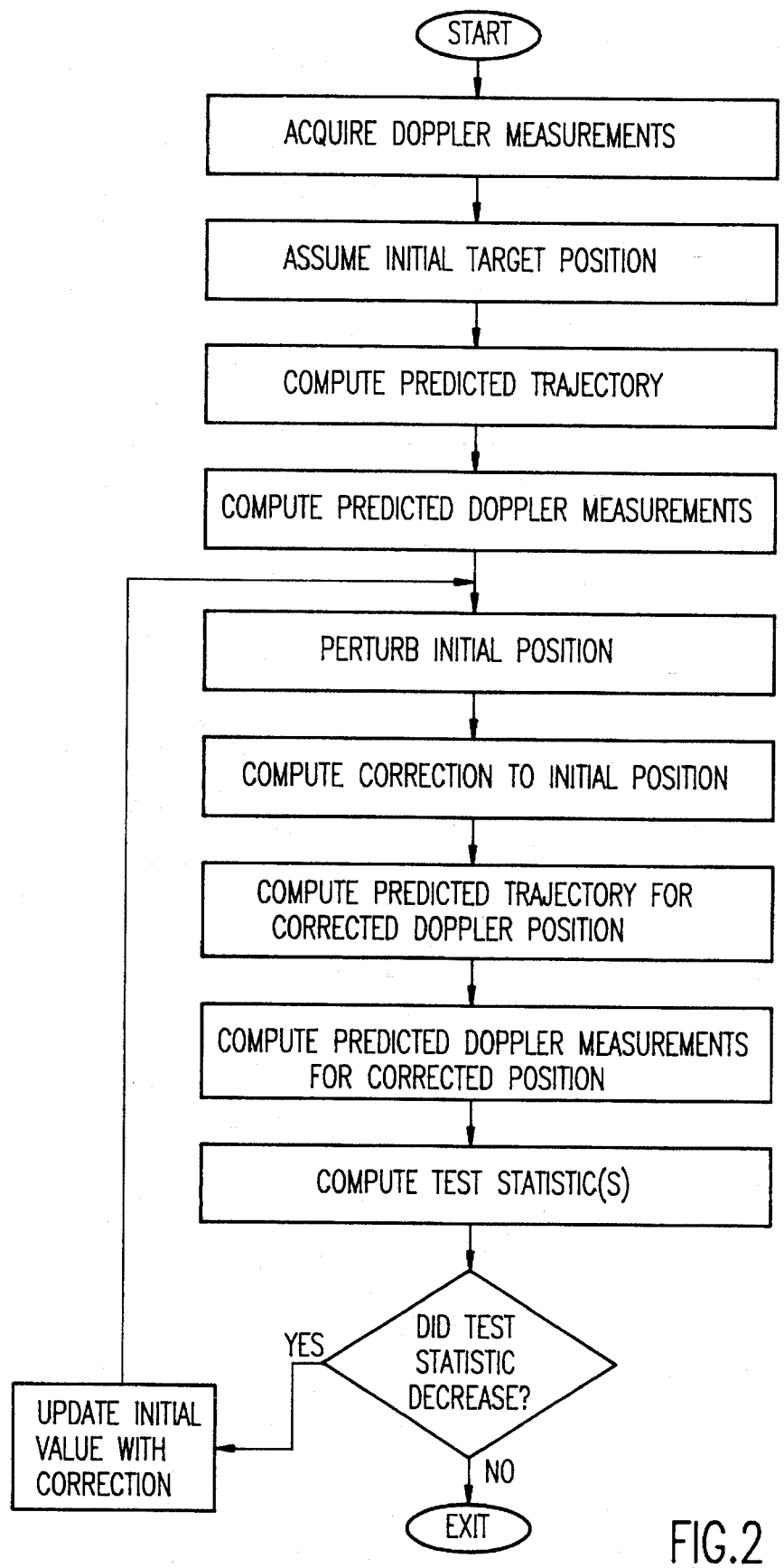
FIG. 2 is a flow chart of the program employed in the computer of the system of the present invention.

The operation of the system will now be described with reference to the flow chart shown in FIG. 2. A source code listing in APL*PLUS of the software of the flow chart is attached hereto as an appendix. As a first step in the process, after the Doppler data has been acquired, the NLS estimator provides an initial estimate of the initial position represented by the values $x_0$ and $y_0$, which are the x and y coordinates of the initial position estimate and which are also referred to herein as the parameter vector. Since the initial estimate does not have to be very accurate, it can be largely a guess and, for example, can differ from the actual target position by over 100 kilometers.

The ROKF also uses the actual Doppler measurements to compute a trajectory for the target 16 from the assumed initial position $x_0$, $y_0$ and thus computes a set of positions for the target trajectory. These computations are carried out by integrating the velocity values obtained from the Doppler measurements and from the assumed initial position $x_0$ and $y_0$. The ROKF then uses the predicted trajectory to compute a set of predicted Doppler measurements. The NLS estimator then generates a perturbation $\delta X$ to the initial position $x_0$, $y_0$ and calls on the ROKF to compute predicted measurements for the perturbed states, whereupon the NLS then constructs the partials $H_n$. The perturbation to the initial value may be, for example, 3000 meters. As a result, the ROKF computes the matrix $H=[H_1:H_2]$ in which $$H_1 = \frac{h(\hat{X} + \delta x_0) - h(\hat{X})}{\delta x_0}$$

$$H_2 = \frac{h(\hat{X} + \delta y_0) - h(\hat{X})}{\delta y_0}$$

In the example, $H_1$ and $H_2$ will each have 204 values, one for each estimated measurement. The partials are then plugged in the NLS equation for $\Delta X$, the computed correction of the initial input position. This equation is given by $$\Delta X = [H^T R^{-1} H]^{-1} H^T R^{-1} [X - h(\hat{X})]$$

in which R is a diagonal matrix $(\sigma_1^2, \sigma_2^2 \ldots \sigma_M^2)$. The equation computes $\Delta X$ for both $H_1$ and $H_2$ to give value $\Delta x_0$ and $\Delta y_0$ to be added to the initial values of $x_0$ and $y_0$. During the initial iterations of the algorithm, the matrix product to be computed in accordance with the above equation may be ill conditioned for inversion. Accordingly, a small scalar multiple of the identity matrix is added to the matrix product prior to inversion to improve the conditioning. With this modification, the differential correction equation becomes $$\Delta X = [H^T R^{-1} H + \alpha I]^{-1} H^T R^{-1} [Z - h(\hat{X})]$$

in which $\alpha$ is the scalar multiple and I is the identity matrix. This variation of the equation for $\Delta X$ is referred to as the Levinberg-Maquardt method. The scalar multiple, for example, may start out initially at a value of $10^{-3}$ and then be decreased by a factor of 10 on each successive iteration of the algorithm.

After computation of $\Delta X$, the NLS adds the value of $\Delta X$ to the assumed initial position and the predicted trajectory is computed from the corrected position. The predicted Doppler measurements are then again computed for the new predicted trajectory. The test statistic is computed for the assumed initial position X and the position $X + \Delta X$. If the test statistic decreases, the initial position is updated by the $\Delta X$ value and the process is repeated. The iteration of the process is repeated until the test statistic stops decreasing in value at which time the initial position will be assumed to be the correct position.

The method by which the Kalman filter computes the estimated Doppler measurements from the estimated initial position $x_0$ and $y_0$ and the actual Doppler measurements will now be described.

The Doppler measurement is defined in terms of the bistatic vector, which is defined as $$\bar{b}_i = \frac{\bar{R} - \bar{R}_0}{|\bar{R} - \bar{R}_0|} + \frac{\bar{R} - \bar{R}_i}{|\bar{R} - \bar{R}_i|}$$

in which
 $\bar{R}$ is target position vector,
 $\bar{R}_0$ is receiver position vector, $R_i$ is transmitter i position vector,
and in which all quantities are referenced to the same instant of time (the time index has been dropped to improve readability). The Doppler measurement for the $i^{th}$ transmitter at a given time instant is given by $$f_{d_i} = -\lambda_i^{-1} \overline{V} \cdot \overline{b}_i$$

in which $$\overline{V} = \cos(\gamma)\overline{e}_x + v\sin(\gamma)\overline{e}_y,$$

$\lambda_i$ = wavelength of ith transmitter's carrier signal,
$(\overline{e}_x, \overline{e}_y, \overline{e}_z)$ = cartesian system unit vectors.

Although the system measures Doppler, the more fundamental (and more convenient) quantity in terms of the estimation problem is the bistatic range rate. First, the bistatic range is defined as the two-leg distance from the transmitter to the target to the receiver, i.e., $$R_{b_i} = |\overline{R} - \overline{R}_0| + |\overline{R} - \overline{R}_i|.$$

It can easily be shown that the bistatic range rate is given by $$\dot{R}_{b_i} = \overline{V} \cdot \overline{b}_i = -\lambda_i f_{d_i}$$

and, hence, is equivalent to the Doppler measurement except for a multiplicative scale factor.

The measurements at time $t_k$ from I transmitters (I=4 in the example) are then given by $$Z_k = \begin{bmatrix} Z_{1k} \\ Z_{2k} \\ \vdots \\ Z_{Ik} \end{bmatrix} = \begin{bmatrix} \dot{R}_{b_{1k}} \\ \dot{R}_{b_{2k}} \\ \vdots \\ \dot{R}_{b_{Ik}} \end{bmatrix}$$

and the predicted measurements are given by $$Z_k = \begin{bmatrix} \overline{V}_{k|k-1} \cdot \overline{b}_{1k} \\ \overline{V}_{k|k-1} \cdot \overline{b}_{2k} \\ \vdots \\ \overline{V}_{k|k-1} \cdot \overline{b}_{Ik} \end{bmatrix}$$

in which $V_{k|k-1}$ is the velocity at time k computed from the data up through time k−1 and in which $$\overline{V}_{k|k-1} = V_{k|k-1}\cos(\gamma_{k|k-1})\overline{e}_x + V_{k|k-1}\sin(\gamma_{k|k-1})\overline{e}_y.$$

In this equation, $\gamma_{k|k-1}$ is the heading at time k computed from the data up through time t=k−1. The bistatic vector is needed in order to compute the predicted measurement vector above, and for this, target position at time $t_k$ is needed. Target position at time $t_k$ is obtained by initializing the position at time t=0 to $[x_0, y_0]^T$ (provided by the NLS estimator) and recursively integrating the velocity. The bistatic vector at time t=0 can be determined from the assumed values of $x_0$ and $y_0$ for the initial position and the known locations of the transmitters and receiver. Since there are four Doppler measurements for each target position including the position at time t=0, the estimated value of $\overline{V}_0$ at time t=0 can be determined from the dot product values $\overline{V}_0 \cdot \overline{b}_{10}, \overline{V}_0 \cdot \overline{b}_{20}, \ldots \overline{V}_0 \cdot \overline{b}_{40}$. From the velocity at time $t_0$ and the position at time $t_0$, the position at time $t_1$ can be determined by integrating the velocity vector $\overline{V}_0$ over one time increment and then the value of the velocity and heading at time $t_1$ can be computed. The process is then repeated for each of the target positions to obtain estimated positions and velocities for target positions and from these estimated target positions, the estimated values of the Doppler measurements are computed from the dot products of the velocities and the bistatic vectors.

The equations for integrating the velocity are as follows:

$$\begin{bmatrix} X_{j+1} \\ Y_{j+1} \end{bmatrix} = \begin{bmatrix} X_j \\ Y_j \end{bmatrix} +$$

$$\frac{V_j}{\dot{\gamma}_j} \begin{bmatrix} \sin[\gamma_j + \dot{\gamma}_j(t_{j+1} - t_j)] - \sin\gamma_j \\ \cos\gamma_j - \cos[\gamma_j + \dot{\gamma}_j(t_{j+1} - t_j)] \end{bmatrix} \text{ whenever } \dot{\gamma}_j \neq 0,$$

or $$\begin{bmatrix} X_{j+1} \\ Y_{j+1} \end{bmatrix} = \begin{bmatrix} X_j \\ Y_j \end{bmatrix} + V_j \begin{bmatrix} \cos\gamma_j \\ \sin\gamma_j \end{bmatrix} \text{ whenever } \dot{\gamma}_j = 0.$$

The value of $\dot{\gamma}_j$, the turn rate at time t=j, is obtained by subtracting the heading at time t=j−1 from the heading at time t=j.

The matrix H of measurement partial derivatives are given by $$H_k = \frac{\partial h_k(X)}{\partial X}\bigg|_{x=x_{k|k-1}} = [H_{kv} : H_{k\gamma} : 0]$$

in which $$H_{kv} = \frac{1}{|\overline{V}_{k|k-1}|} \begin{bmatrix} \overline{V}_{k|k-1} \cdot \overline{b}_{1k} \\ \overline{V}_{k|k-1} \cdot \overline{b}_{2k} \\ \vdots \\ \overline{V}_{k|k-1} \cdot \overline{b}_{Ik} \end{bmatrix}$$

$$H_{k\gamma} = |\overline{V}_{k|k-1}| \begin{bmatrix} -b_{1kx}\sin(\gamma_{k|k-1}) + b_{1ky}\cos(\gamma_{k|k-1}) \\ -b_{2kx}\sin(\gamma_{k|k-1}) + b_{2ky}\cos(\gamma_{k|k-1}) \\ \vdots \\ -b_{Ikx}\sin(\gamma_{k|k-1}) + b_{Iky}\cos(\gamma_{k|k-1}) \end{bmatrix}$$

and in which $$\overline{b}_{ik} = b_{ikx}\overline{e}_x + b_{iky}\overline{e}_y + b_{ikz}\overline{e}_z$$

for $1 \leq i \leq I$. The vector $\overline{b}_{ik}$ is the $i^{th}$ bistatic vector (associated with transmitter i) at time $t_k$.

A Kalman filter estimates a state vector and its covariance over an interval of time. In order to apply a Kalman filter to a problem, two models must be defined: a dynamic model that characterizes the motion of the state vector over the interval of time, and a measurement model that expresses the measurement mathematically as a function of the state vector. When either the dynamic model or measurement model is nonlinear, the Kalman filter is generally referred to as an Extended Kalman Filter. The dynamic and measurement models are given by the equations $$X_{k+1} = f_k(X_k) + W_k$$

$$Z_k = h_k(X_k) + \zeta_k,$$

in which $X_k$ is the state vector at time $t_k$, $f_k$ describes the dynamic behavior of the state vector, $W_k$ represents the process noise, or unmodeled random dynamic behavior of the state, $h_k$ expresses the measurements in terms of the state vector, and $\zeta_k$ is the random zero-mean Gaussian measurement noise.

The process noise $W_k$ and the measurement noise $\zeta_k$ are each assumed to be zero-mean, and to have covariances $$E[W_j W_k^T] = \delta_{jk} Q_k$$

$$E[\zeta_j \zeta_k^T] = \delta_{jk} R_k$$

The Kalman filter is initialized at time t=0 with an estimate of the state vector $X_{0|-1}$ and its covariance matrix $P_{0|-1}$. As indicated above, the subscripting notation identifies the time of the estimate as well as the data upon which the estimate is based. For example, $X_{k|k-1}$ indicates the state vector estimate at time $t_k$ based on all data up through and including time $t_{k-1}$. In the case here, $X_{0|-1}$ indicates the state vector estimate at time t=0 based on no data as yet. The Kalman filter equations then propagate the state vector estimate and its covariance forward, step by step, through the prescribed time interval, processing the data as it is encountered and updating its estimates of the state vector and covariance at each time-step to reflect the additional information provided by the new data.

The Kalman Filter equations have a "predictor-corrector" form and are given by $$X_{k|k-1} = f_{k-1}(X_{1|k-1})$$

$$P_{k|k-1} = F_{k-1} P_{k-1|k-1} F^T_{k-1} + Q_{k-1}$$

$$K_k = P_{k|k-1} H_k^T [H_k P_{k|k-1} H_k^T + R_k]^{-1}$$

$$P_{k|k} = [I - K_k H_k] P_{k|k-1}$$

$$X_{k|k} = X_{k|k-1} + K_k [Z_k - h_k(X_{k|k-1})]$$

in which $$F_k = \frac{\partial f_k(X)}{\partial X}\bigg|_{x=x_{k|k}}, H_k = \frac{\partial h_k(X)}{\partial X}\bigg|_{x=x_{k|k-1}}$$

The first two of the above five Kalman filter equations are the "predictor" equations. These propagate the state vector and its covariance from time $t_{k-1}$ to time $t_k$. The latter three Kalman filter equations above are the "corrector" equations. The first of these computes a gain matrix $K_k$, which control the size of the correction to be made to the state vector and the adjustment to the covariance matrix. The latter two corrector equations then make the correction to the state and adjustment to the covariance, thereby incorporating the new information contained in the data vector $Z_k$ into the state and covariance estimates.

The two step process of executing the five Kalman filter equations to (1) propagate the estimates to the next time point and (2) incorporate the new data at this time into the estimates, is repeated until the Kalman filter has moved through the entire time interval, and has estimated the state and covariance at each time point $t_k$ within the interval.

An important quantity, the measurement residuals appear inside the brackets of the fifth Kalman filter equation above. The measurement residuals are the difference between the actual measurements and the measurements predicted by the Kalman filter based on all previous data, and are given by $$Z_k - \hat{Z}_k = Z_k - h(X_{k|k-1})$$

The statistics of these residuals are an important measure of the performance of the Kalman filter.

Figure 3:
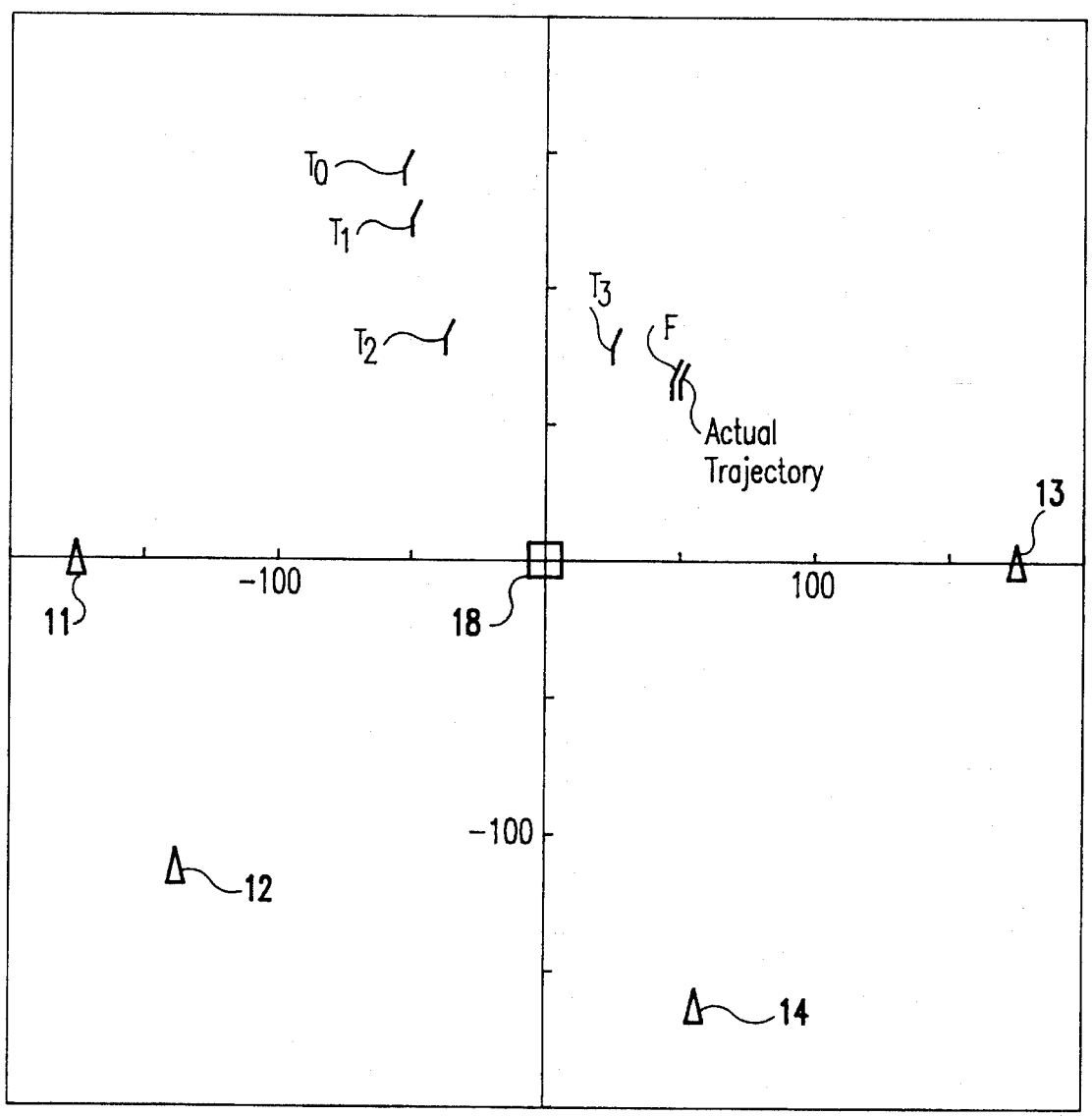
FIG. 3 is a schematic illustration of a display generated by the system of the present invention showing the trajectory of the target as detected by the system of the invention.

FIG. 3 illustrates a display generated by the system of the invention for a specific example of the target trajectory. In the specific example, the trajectory was simulated for a 50 second period in which the target had a simulated altitude of 4 kilometers and a speed of 300 meters per second. The trajectory contained two maneuvers at times 20 and 30 seconds. At time t=0, the target's position was $x_0$=60 kilometers and $y_0$=80 kilometers and it had a constant heading. At 20 seconds into the flight, the target initiated a turn at 3 degrees per second and held this turn rate for 10 seconds. The target then leveled out to a constant heading for the final 20 seconds of the data interval. In the example, the initial position was assumed to have x and y coordinates, $x_0$=−50 kilometers and $y_0$=150 kilometers. It should be noted that this trial solution had an error of more than 130 kilometers and is a rather poor starting point for the computation. The display in FIG. 3 shows the actual trajectory of the target and shows the trajectory is computed by the system of the invention in successive iterations through the algorithm with the first four iterations being represented by the trajectories $T_0$ through $T_3$ and the final trajectory computed by the system on the fifth iteration being represented by F.

The above-described specific embodiment of the W radar system employs four transmitters and one receiver. Alternatively, the system could employ a plurality of transmitters and one receiver. The CW radar system needs to provide at least two measurements of bistatic range and therefore should have at least two transmitters or at least two receivers.

For purposes of simplifying the explanation of the invention, the above described example was limited to a target moving at a constant speed and with only non-position states consisting of velocity, heading and heading rate. It will be apparent that the system is applicable to targets moving in three dimensions and with acceleration as an added non-position state.

The above description of the invention is in the context of a target of which the position of the target is not directly available from received measurements. The system may also be used advantageously in systems in which position information is directly available but in which quality of the position information is poor.

The above description is of a preferred embodiment of the invention and modification may be made thereto without departing from the spirit and scope of the invention which is defined in the appended claims.

APPENDIX

⍝ -=-=-=-=-=-= LISTINGS FOR TRACK INITIALIZATION ('TRKINIT.AWS') -=-=-=-=-=

⍝ I. SIMULATOR -=-=-=-=-=

```
     ⎕VR 'BUILDDATA'
    ∇ BUILDDATA
[1]   z0←4000
[2]   zest←4000
[3]   r0h0←(1000× 60 80 4),RAD ¯135
[4]   dy← 300 0 20
[5]   dy←dy,[0.1]300,(RAD 3),10
[6]   dy←dy,[1]300,0,20
[7]   TRJ←r0h0 SIMULATOR dy
[8]   GENTX
[9]   rrvar←1
[10]  GENRNGRATE
    ∇

⎕VR 'SIMULATOR'
    ∇ X←R0H0 SIMULATOR DY;NS;I;T0;X0T0;TAU
[1]   ⍝ SIMULATE 5 STATES (X,Y,Z,V,H,TR) FOR
[2]   ⍝ TRAJECTORY WITH INIT POS AND HEADING (R0H0) = X0,Y0,Z0,H0
[3]   ⍝ AND DYNAMICS DESCRIBED BY (DY)
[4]   ⍝ (DY) IS N×3, COLS = V,TR,DT. EACH ROW DESCRIBES
[5]   ⍝ ONE TRAJ SEGMENT. OUTPUT (X) IS M×6, COLS = T,X,Y,Z,V,H,TR
[6]   ⍝ *** DT TAKEN TO BE INTEGER SECONDS ***
[7]   ⍝ *** GLOBAL (z0) SET TO TRAJ ALT ***
[8]    X← 0 6 ⍴0 ◊ NS←1↑⍴DY ◊ z0←R0H0[3]
[9]    I←1 ◊ T0←0 ◊ X0T0←R0H0[⍳2],DY[1;1],R0H0[4],DY[1;2],T0
[10] LP:TAU←T0+⍳DY[I;3] ◊ X0T0[3 5]←DY[I; 1 2]
[11]   X←X,[1]X0T0 PROPSEG TAU
[12]   X0T0←(,(¯1 6)↑X)[2 3 4 5 6 1]
[13]   T0←X0T0[6]
[14]   →LP×⍳NS≥I←I+1
    ∇

⎕VR 'PROPSEG'
    ∇ X←X0T0 PROPSEG TAU;V;TR;H0;T;H
[1]   ⍝ (X0T0) IS THE STATE VECTOR (X0) AND EPOCH TIME (T0)
[2]   ⍝ STATES ARE X0,Y0,V0,H0,TR0
[3]   ⍝ STATES ARE PROPAGATED THRU ONE SEGMENTS
[4]   ⍝ MODEL IS CONST V, CONST TR, FIXED Z
[5]   ⍝ OUTPUT (X),DIM (N×6), COLS ARE T,X,Y,V,H,TR
[6]    V←X0T0[3] ◊ TR←X0T0[5] ◊ H0←X0T0[4]
[7]    T←TAU-X0T0[6]
[8]    H←H0+TR×T
[9]    →AP×⍳(|TR)≤1E¯6
[10]   X←X0T0[1]+(V÷TR)×(1○H0+TR×T)-1○H0
[11]   X←X,[1.1]X0T0[2]+(V÷TR)×(2○H0)-2○H0+TR×T
[12]   →CO
[13] AP:X←X0T0[1]+V×(T×2○H0)-(1○H0)×0.5×TR×T*2
[14]   X←X,[1.1]X0T0[2]+V×(T×1○H0)+(2○H0)×0.5×TR×T*2
[15] CO:X←TAU,X,V,H,[1.1]TR
    ∇

⎕VR 'GENTX'
    ∇ GENTX
[1]   tx← 4 4 ⍴0
[2]   tx[1;⍳2]←1000×175× 2 1 ○RAD 0
[3]   tx[2;⍳2]←1000×175× 2 1 ○RAD ¯70
```

```
[4]   tx[3;ι2]←1000×175× 2 1 ○RAD ¯140
[5]   tx[4;ι2]←1000×175× 2 1 ○RAD ¯180
[6]   '3I5,F7.1' ⎕FMT txx 4 4 ρ(3ρ1E¯3),1E¯6
    ∇

⎕VR 'GENRNGRATE'
  ∇ GENRNGRATE
[1]   Z←((1↑ρTRJ)ρ1)RNGRATE TRJ
[2]   Z←Z,[1]((1↑ρTRJ)ρ2)RNGRATE TRJ
[3]   Z←Z,[1]((1↑ρTRJ)ρ3)RNGRATE TRJ
[4]   Z←Z,[1]((1↑ρTRJ)ρ4)RNGRATE TRJ
[5]   Z[;3]←Z[;3]+(rrvar*0.5)×NORMAL 1↑ρZ
    ∇

⎕VR 'RNGRATE'
  ∇ Z←J RNGRATE X;V;H;TR;R;E;EI;RR
[1]   ⍝ COMPUTE RR MEAS FOR STATES (X), ILLUM INDICES (J)
[2]   ⍝ (X) HAS DIM (N×6); COLS ARE T,X,Y,V,H,TR
[3]   ⍝ (J) IS ROW INDEX INTO ILLUM TABLE (tx)
[4]   ⍝ FIXED ALTITUDE IS IN GLOBAL (z0)
[5]   ⍝ MEAS VAR IN GLOBAL (rrvar)
[6]   V←X[;4] ◊ H←X[;5] ◊ TR←X[;6]
[7]   R←X[; 2 3],z0
[8]   E←R÷E,E,[1.1]E←(+/R*2)*0.5
[9]   EI←(R-tx[J;ι3])÷EI,EI,[1.1]EI←(+/(R-tx[J;ι3])*2)*0.5
[10]  V←(V,[1.1]V)×⍉ 2 1 ∘.○H ⍝ (V) IS NOW VELOC IN CART COORD
[11]  RR←+/V×E[;ι2]+EI[;ι2]
[12]  Z←X[;1],1,RR,rrvar,[1.1]J
    ∇

⎕VR 'NORMAL'
  ∇ Z←NORMAL N;U;I
[1]   ⍝ Produces (N) picks from a normal distribution; mean = 0, variance = 1.
[2]   U←1E¯6×¯0.5+?(I←I+2|I←×/N)ρ1000000
[3]   Z←Nρ(Iρ(¯2×⍟(0.5×I)↑U)*0.5)×, 2 1 ∘.○2×(0.5×I)↓U
    ∇

⍝ II. TRACK INITIALIZATION - NLS PART -=-=-=-=-=-=

⎕VR 'TRKINIT'
  ∇ XN←X0T0 TRKINIT Z;LM;EPS;ID;NS;H;Y;E2;DE2;HS;DX;T0;X0;⎕PP;INB
[1]   ⍝ NONLINEAR LS FIT - LEVENBERG-MARQUART ALG
[2]   ⍝ (X0T0) - INIT STATEVEC, TIME.  FORMAT - [X0 Y0 T0]
[3]   ⍝ (Z) - MEAS DATA.  FORMAT - [;T MTYP MEAS VAR TXINDEX]
[4]   ⎕PP←4 ◊ X0←X0T0[ι2] ◊ T0←X0T0[3]
[5]   LM←1E¯4 ◊ EPS←0.05 ◊ ID←(NS,NS)ρ(NS+1)↑1,(NS←ρX0)ρ0
[6]   ΔOUT←((ρX0),2)ρ0
[7]   ΔOUT[;1]←XN←X0
[8]   (XN, 0 0 0 ,T0)FILTER3 Z
[9]  LO:INB←INO[;1]
[10]  E2←+/((INO[;1])*2)÷INO[;2]
[11]  'X0:',(,'2F8.2' ⎕FMT 1E¯3×XN),' ==> RES:',(,'F10.1' ⎕FMT E2)
[12]  (XN,T0)PARTIALS Z
[13]  HS←⍉H÷⍉(⌽ρH)ρ1
[14] LI:DX←(⌹(HS+.×H)+LM×ID)+.×HS+.×INB
[15]  (40ρ' '),'DX:',(,'2F8.2' ⎕FMT 1E¯3×DX),' <== LAM:',⍕LM
[16]  ((XN+DX), 0 0 0 ,T0)FILTER3 Z
```

```
[17]    DE2←(+/((INO[;1])*2)÷INO[;2])-E2
[18]    →EX×ι(|DE2)≤EPS
[19]    ±(DE2>EPS)/'LM←10×LM ◊ →LI'
[20]    LM←0.1×LM ◊ ΔOUT[;2]←XN←XN+DX ◊ →LO
[21] EX:'XY COV'
[22]    fcov←⌹HS+.×H ◊ 1E¯3×(1 1 ⍉fcov)*0.5
[23]    'INITIAL/FINAL STATES'
[24]    ΔOUT
      ∇

⎕VR 'PARTIALS'
    ∇ X0T0 PARTIALS Z;DEL;M;N;I
[1]  ⍝ OUTPUT:   (H) - PARTIALS
[2]  ⍝ CALLING FCN:  (TRKINIT)
[3]     X0←X0T0[ι2] ◊ T0←X0T0[3]
[4]     M←ρX0 ◊ DEL←(M,M)ρ,del,(M,M)ρ0
[5]     I←1 ◊ H←((1↑ρZ),ρX0)ρ0
[6]  LP:((X0+DEL[I;]), 0 0 0 ,T0)FILTER3 Z
[7]     H[;I]←-INO[;1]
[8]     ((X0-DEL[I;]), 0 0 0 ,T0)FILTER3 Z
[9]     H[;I]←(H[;I]+INO[;1])÷2×DEL[I;I]
[10]   →LP×ιM≥I←I+1
      ∇

⍝ III. TRACK INITIALIZATION - ROKF PART -=-=-=-=-=-=

⎕VR 'FILTER3'
    ∇ X0T0 FILTER3 Z;X;P;F;H;G;ETA;ETAVAR;T;K;NSTA;ID
[1]  ⍝ EXTENDED KALMAN FILTER FOR NB DOPPLER-ONLY DATA
[2]  ⍝ ***** ESTIMATES STATES [V,H,TR] ONLY ******
[3]  ⍝ (X0T0) - INIT STATE AND TIME [X,Y,V,H,TR,T]
[4]  ⍝ (Z) - MEAS ARRAY (N×5) [T,TYP,MEAS,VAR,TXID]
[5]  ⍝ GLOBAL OUTPUTS:
[6]  ⍝   (STA) - STATE ARRAY (M×6) [T,X,Y,V,H,TR]
[7]  ⍝   (COV) - STATE COV DIAG (M×5)
[8]  ⍝   (INO) - INNOVS ARRAY (M×2) [ETA,ETAVAR]
[9]  ⍝   (MAN) - MANEUVER FLAG (M) 0/1 WITH MAN=1
[10] ⍝ GLOBAL INPUTS:
[11] ⍝   (COV0) - INIT COV
[12] ⍝   (Q) - Q MATRIX, NON-MANEUVERING
[13] ⍝   (zest) - EST ALTITUDE (METERS)
[14] ⍝ INITIALIZE GLOBAL OUTPUTS
[15]    NSTA←⌈1+(⌈/Z[;1])-X0T0[6]
[16]    STA←(NSTA,6)ρ0
[17]    COV←(NSTA,5)ρ0
[18]    MAN←NSTAρ0
[19]    INO←((1↑ρZ),2)ρ0
[20]    STA[1;]←X0T0[6,ι5] ◊ COV[1;]← 1 1 ⍉COV0
[21]    SSUM←0
[22] ⍝ INITIALIZE FILTER
[23]    X←X0T0[ι5] ◊ T←X0T0[6] ◊ P←COV0[2+ι3;2+ι3]
[24]    STA[1; 4 5]←X[3 4]←X[1 2]EKFSTUP Z[(Z[;1]=T)/ι1↑ρZ;]
[25] ⍝ 'INIT V,H ',⍕X[3],DEG X[4]
[26]    ID← 3 3 ρ1,3ρ0 ◊ K←2
[27] ⍝ -=-=-= FILTER LOOP =-=-=-=-=-*-=-=-=-=-=
[28] LP:T←T+1
[29]    X←(T+ ¯1 0)EKFPROP3 X
```

```
[30]    P←(F+.×P+.×⌽F)+Q[2+⍳3;2+⍳3]
[31]    ETA←T EKFINOV3 X
[32]    →BOT×⍳0≥⍴ETA
[33]    P←P+T EKFMANU3 X
[34]    G←P+.×(⌽H)+.×⊟ETAVAR
[35]    X←(G+.×ETA)EKFLIM3 X
[36]    P←(ID-G+.×H)+.×P
[37] BOT:STA[K;]←T,X
[38]    COV[K;]← 0 0 ,, 1 1 ⍀P
[39]    →LP×⍳NSTA≥K←K+1
[40]    ⍝ 'APPROX SUM OF RES SQ = ',⍕+/1↓(INO[;1]*2)÷INO[;2]
[41]    ⍝ 'SUM OF RES SQ = ',⍕SSUM
     ∇

⎕VR 'EKFSTUP'
   ∇ VH←XY EKFSTUP Z;X;J;E;EI;H;V
[1]     X←((1↑⍴Z),3)⍴XY,zest
[2]     J←Z[;5]
[3]     E←X÷E,E,[1.1]E←(+/X*2)*0.5
[4]     EI←(X-tx[J;⍳3])÷EI,EI,[1.1]EI←(+/(X-tx[J;⍳3])*2)*0.5
[5]     H←E[;⍳2]+EI[;⍳2]
[6]     V←(⊟(⌽H)+.×H)+.×(⌽H)+.×Z[;3]
[7]     VH←((+/V*2)*0.5),V[1]ATAN V[2]
     ∇

⎕VR 'EKFPROP3'
   ∇ X1←T EKFPROP3 X0;X;Y;V;SH0;CH0;H1;TR;DT
[1]     ⍝ (X0) IS THE STATE VECTOR AT TIME (T[1])
[2]     ⍝ X0 WILL BE PROPAGATED TO (X1) AT TIME (T[2]).
[3]     ⍝ STATES: [X,Y,V,H,TR] **** ONLY V,H,TR ARE ESTIMATED ****
[4]     ⍝ MODEL IS CONST V, CONST TR, FIXED Z
[5]     ⍝ PROPAGATE THE STATE
[6]     V←X0[3] ◇ TR←X0[5] ◇ X←X0[1] ◇ Y←X0[2]
[7]     DT←T[2]-T[1] ◇ SH0←1○X0[4] ◇ CH0←2○X0[4]
[8]     X1← 0 0 ,V,(H1←X0[4]+TR×DT),TR
[9]     →AP×⍳(|TR)≤1E¯6
[10]    X1[1]←X+(V÷TR)×(1○H1)-SH0
[11]    X1[2]←Y+(V÷TR)×(CH0)-2○H1
[12]    →CO
[13] AP:X1[1]←X+V×DT×CH0-SH0×0.5×TR×DT
[14]    X1[2]←Y+V×DT×SH0+CH0×0.5×TR×DT
[15]    ⍝ COMPUTE PROPAGATION PARTIALS
[16] CO:F← 3 3 ⍴ 1 0 0 0 1,DT, 0 0 1
     ∇

⎕VR 'EKFINOV3'
   ∇ ETA←T EKFINOV3 X;I;J;RT;R;V;W;E;UR;UE;M;RR
[1]     ⍝ INNOVATIONS PROCESSING FUNCTION - SUBFCN TO 'FILTER3'
[2]     ⍝ (T) - CURRENT STATE TIME, (X) - CURRENT STATE [X,Y,V,H,TR]
[3]     ⍝ GLOBALS: (TRUE GLOBALS AND 'FILTER' LOCALS
[4]     ⍝ (Z) - MEAS ARRAY (N×5) [T,TYP,MEAS,VAR,TXID] ('FILTER' LOCAL)
[5]     ⍝ (zest) - ASSUMED ALTITUDE, (P) - STATE COV ('FILTER' LOCAL)
[6]     ⍝ OUTPUTS:
[7]     ⍝ (ETA) - INNOV (DIM=M), (H) - MEAS COV ARRAY (M×5), (INO) - INOV OUTPUTS
[8]     ⍝ EXTRACT MEAS FOR THIS TIME, EXIT IF NONE
[9]     I←(Z[;1]=T)/⍳1↑⍴Z
[10]    ETA←(⍴I)⍴0
[11]    →EX×⍳0≥M←⍴ETA
[12]    ⍝ COMPUTE PREDICTED DOPPLER (NU)
[13]    J←Z[I;5] ⍝ (J) IS ILLUM TBL INDEX
```

```
[14]    RT←((ρI),3)ρX[1 2],zest ⍝ EST TARGET VECTOR FR  RX
[15]    V←((ρI),2)ρX[3]× 2 1 ○X[4]
[16]    UR←RT[;⍳2]÷R,[1.1]R←(+/RT*2)*0.5 ⍝ X,Y COMP OF UNIT VECTOR RX-TO-TGT
[17]    UE←(RT[;⍳2]-tx[J;⍳2])÷E,[1.1]E←(+/(RT-tx[J;⍳3])*2)*0.5 ⍝ TX-TO-TGT
[18]    ETA←Z[I;3]-RR←+/V×UR+UE
[19]    ⍝ COMPUTE MEAS PARTIAL ARRAY (H)
[20]    H←((RR÷X[3]),[1.1]0),0
[21]    H[;2]←+/(((ρI),2)ρX[3]× 1 2 ○-X[4])×UR+UE
[22]    ⍝ COMPUTE INNOV VARIANCES
[23]    ETAVAR←(H+.×P+.×⍉H)+(M,M)ρZ[I;4],(M,M)ρ0
[24]    INO[I;]←ETA,[1.1], 1 1 ⍉ETAVAR
[25] EX:→⍳0
     ∇

⎕VR 'EKFMANU3'
     ∇ QB←T EKFMANU3 X;S
[1]    QB← 3 3 ρ0
[2]    →EX×⍳0≥ρETA
[3]    SSUM←SSUM+S←ETA+.×(⌹ETAVAR)+.×ETA
[4]    →EX×⍳3≥S←S÷ρETA
[5]  ⍝ QB[1;1]←1
[6]  ⍝ QB[3;3]←(RAD 4)*2
[7]  ⍝ QB[2;2]←(RAD 2)*2
[8]    MAN[K]←1
[9] EX:→⍳0 ⍝T,S,MAN[K]
     ∇

⎕VR 'EKFLIM3'
     ∇ Y←DX EKFLIM3 X;DY
[1]    DY←DX
[2]    DY[1]←(×DY[1])×20⌊|DY[1]
[3]    DY[2]←((○2)|DY[2]+○1)-○1
[4]    DY[3]←((○2)|DY[3]+○1)-○1
[5]    DY[2]←(×DY[2])×(RAD 20)⌊|DY[2]
[6]    DY[3]←(×DY[3])×(RAD 10)⌊|DY[3]
[7]    Y←X+0,0,DY
[8]    Y[3]←100⌈Y[3]
[9]    Y[4]←((○2)|Y[4]+○1)-○1
[10]   Y[5]←((○2)|Y[5]+○1)-○1
     ∇

⍝ IV. DRIVER FOR TRACK INITIALIZATION -=-*-=-=-=

⎕VR 'RUN'
     ∇ RUN
[1]    zest←4000
[2]    X0T0←(1000× ¯50 150), 0 0 0 ,1
[3]    del←1000× 3 3
[4]    COV0←DIAG(0 0 5 ,RAD 5 2)*2
[5]    Q←DIAG(0 0 1 ,RAD 1 1)*2
[6]    XN←X0T0[1 2 6]TRKINIT Z
     ∇

⍝ V. UTILITIES -=-*-=-=-*-=-=
```

⍝ V. UTILITIES -=- !-=-=

```
      ⎕VR 'ATAN'
    ∇ Z←X ATAN Y
[1]   Z←(((0=×Y)+×Y)×(○1×¯1=×¯3○X))+¯3○Y÷X←X+1E¯15×X=0
    ∇

⎕VR 'DB'
    ∇ R←DB X
[1]   R←10×10⍟X
    ∇

⎕VR 'DEG'
    ∇ R←DEG A
[1]   R←180×A÷○1
    ∇

⎕VR 'RAD'
    ∇ R←RAD D
[1]   R←○D÷180
    ∇

⎕VR 'DIAG'
    ∇ Y←DIAG X
[1]   Y←(2⍴⍴X)⍴X,(2⍴⍴X)⍴0
    ∇
```

⍝ VI. KEY SYSTEM PARAMETERS -=-=-=-=-=-=

⍝ VI.1 NUMERICAL PARTIALS COMPUTATION STEP SIZE (dX0,dY0)

```
      del
3000 3000
```

⍝ VI.2 TX LOCATIONS (X,Y,Z)

```
      tx[;⍳3]
 175000              0                0
  59853.52508      ¯164446.2086        0
¯134057.7775      ¯112487.8317         0
¯175000            ¯2.14313894E¯11     0
```

⍝ VI.3 LEVENBERG-MARQUART NLS STABILITY CONTROL SCALAR (ALPHA)

⍝ 1E¯4

I claim:

1. A system for detecting the initial position of a target comprising at least one Doppler radar transmitter and at least one Doppler radar receiver arranged to provide at least two bistatic range measurements, NLS estimator means, to assume an initial position as an input initial position for a target reflecting bistatic CW radar signals from said Doppler transmitters to said Doppler receiver, to perturb said input initial position, and to generate a test statistic from Doppler measurements made by said Doppler receivers compared with predicted Doppler measurements, Kalman filter means to generate predicted Doppler measurements for a trajectory starting from said input initial position and to generate a correction value for said input initial position in response to a perturbation in said initial value, said Doppler measurements and said predicted Doppler measurements, and programming means to cause said NLS estimator means and said Kalman filter means to perform the following steps:

(1) supply said initial position assumed by said NLS estimator means as an input initial position to said Kalman filter means, (2) cause said Kalman filter means to generate a set of predicted Doppler measurements from an input initial position received from said NLS estimator means, (3) supply a perturbed initial position from said NLS estimator to said Kalman filter means, (4) cause said NLS estimator means to generate a correction to said input initial position from said perturbed initial position, from said Doppler measurement, and from said predicted Doppler measurements, (5) cause said Kalman filter to generate a second set of predicted Doppler measurements from said input position corrected by said correction, (6) cause said NLS estimator means to compute a first value for said test statistic from said Doppler measurements compared to said first set of predicted Doppler measurements and to compute a second value for said test statistic from said Doppler measurements compared to said second set of predicted Doppler measurements, (7) cause said NLS estimator means to update said input initial position with said correction if said second value of said test statistic is less than said first value of said test statistic computed in step (6), and (8) reiterate steps (2) through (7) each time the second value of said test statistic is less than the first value of said test statistic.

2. A system as recited in claim 1, wherein said test statistic is represented by $X^2$ and comprises $$\chi^2(\hat{X}) = \sum_{i=1}^{M} \left( \frac{Z_i - \hat{Z}_i}{\sigma_i} \right)^2,$$

in which Z equals said Doppler measurements throughout the trajectory, $\hat{Z}$ equals estimated Doppler measurements throughout the target trajectory, and $\sigma^2$ is the variance of the Doppler measurements.

3. A method of determining the initial position of a target at the start of a trajectory through which said target moves comprising the following steps:

1) reflecting bistatic CW radar signals from said target, 2) receiving bistatic CW radar signals from said target to provide a plurality of Doppler measurements at each of a plurality of points distributed along said trajectory, 3) assuming a position of said target as an initial position at the start of said trajectory, 4) determining a predicted trajectory for said target from said initial position of said target as starting position for said predicted trajectory and from said Doppler measurements, 5) determining a predicted set of Doppler measurements from the predicted trajectory determined in step 4), 6) computing a test statistic from a comparison of the actual Doppler measurements obtained in step 2) with the predicted Doppler measurements obtained in step 5), 7) determining a correction for the initial position, 8) repeating steps 4) through 6) using an initial position corrected in accordance with the correction determined in step 7) to thereby compute a test statistic for the corrected initial position, 9) determining whether the test statistic computed in step 8) is greater or less than the test statistic in the previous iteration of step 6) and if the test statistic has decreased, repeating steps 7) through 9) until test statistic stops decreasing.

4. A method as recited in claim 3, wherein said correction determined in step 7) is computed by a nonlinear least squares estimator from a perturbation in the initial position and a comparison of the Doppler measurements and the predicted Doppler measurements.

5. A method as recited in claim 4, wherein the value of said correction is determined from the partial derivative of the perturbation of the initial position and from the sum of the differences between the Doppler measurements and the predicted Doppler measurements.

6. A method as recited in claim 4, wherein said nonlinear least squares estimator computes the correction to said initial position from the equation $$\Delta X = [H^T R^{-1} H]^{-1} H^T R^{-1} [Z - h(\hat{X})]$$

in which H is a matrix representing the partial derivative of the perturbation in the initial position, R is a diagonal matrix representing the variance in Doppler measurements, and $Z - H(\hat{X})$ is a column matrix representing the difference between the Doppler measurements and the predicted Doppler measurements at points distributed along the target trajectory.

* * * * *